April 23, 1968 M. H. NORWALK 3,379,543
COMPOSITION AND METHOD FOR MAKING CERAMIC ARTICLES
Filed March 27, 1964
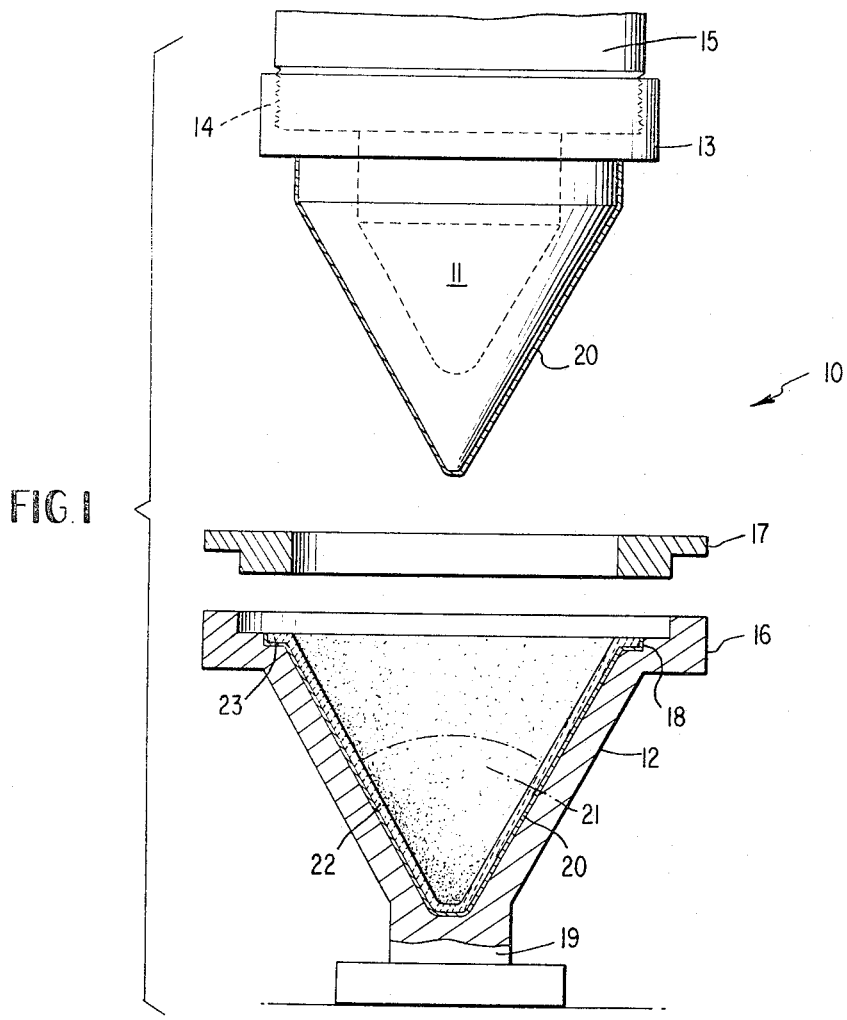
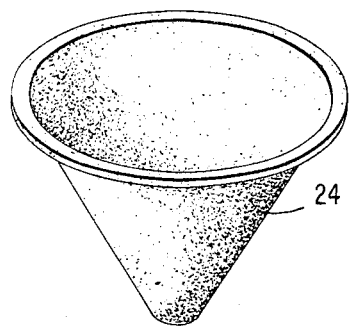
INVENTOR.
MARSHALL H. NORWALK
BY
*Sughrue, Rothwell, Mion and Zinn*
ATTORNEYS

United States Patent Office 3,379,543
Patented Apr. 23, 1968

3,379,543
COMPOSITION AND METHOD FOR MAKING CERAMIC ARTICLES
Marshall H. Norwalk, Watkins Glen, N.Y., assignor to Corning Glass Works, Corning, N.Y., a corporation of New York
Filed Mar. 27, 1964, Ser. No. 355,325
8 Claims. (Cl. 106—39)

ABSTRACT OF THE DISCLOSURE

A ceramic molding composition comprising ceramic particles, water and guar gum and a method of forming a ceramic article by mixing the above ingredients, aging the mixture and pressing the mixture at a temperature not to exceed 120° C.

---

This invention relates to a composition and to a method for molding ceramic articles. More specifically, the present invention relates to compositions and methods for molding articles rapidly from ceramic compositions which are non-plastic and which do not contain clay.

In current practice, ceramic compositions which are free from clay and which are non-plastic are molded by any of several methods. In general, a finely divided ceramic powder is mixed with water and/or binding material and is then molded, dried and fired. Both the rate or speed of molding and the intricacy of the shapes which can be formed from such compositions are relatively limited due to the poor flow properties of the ceramic powder mixture and the inefficiencies of the individual molding methods, such as slip casting and hydrostatic pressing. Although it is a relatively fast process, dry-pressing is also limited in regard to the shape, variety and intricacy of products which can be molded by this method.

Slip casting comprises placing dry ceramic materials in blungers with a substantial amount of water (e.g. 25–35%) and the proper amount of electrolyte, which can be sodium silicate and/or sodium carbonate, to obtain the desired fluidity in the slip. The ceramic body and water are thoroughly mixed, screened and passed through a magnetic separator. The mixture has the consistency of light cream and flows readily.

Generally, plaster of Paris molds are used for the formation of fired ware from the slip. The molds are filled with slip and let stand for 15 to 30 minutes or longer depending on the desired wall thickness of the ware, after which excess slip is poured out. The plaster of Paris absorbs the water and the ceramic body is left as a lining on the walls of the mold. After the excess slip is poured out, the remainder is allowed to drain for periods of from 20 to 45 minutes in a warm place. At the end of this time, the ceramic lining has set and shrunk sufficiently to permit removal from the mold.

Slip casting may be employed to manufacture hollow ware, but is used principally in the formation of solid pieces. Solid objects are not drained, but are allowed to remain in the mold until they set. The time required for this operation takes several hours and more slip is added at intervals to replace the water absorbed by the plaster mold and to avoid a hollow center. After the cast ware is formed and trimmed, it is dried in hot air dryers and then fired.

Although slip casting is used in the commercial production of unfired ceramic ware, it is not a highly economical process due to the great amount of time required in some of the operations. Other factors that mitigate against slip casting include the large amount of hand labor that is required in the process in addition to stringent process controls. For example, casting rates must be held within close limits and mold conditions, such as porosity and moisture content, must be uniform from casting to casting.

Another commercial method for manufacturing unfired, non-plastic, ceramic materials is dry-pressing, which has been used for the formation of pieces that deviate only slightly from a flat configuration. The dry-pressing technique differs principally from slip casting in the consistency of the unfired ceramic material that is to be molded. As the name implies, dry-pressing relates to a process for forming articles from batches that are almost dry, but which will conform to the shape of a mold under pressure. The process usually comprises mixing a ceramic powder with just enough water or organic binder (e.g., polyvinyl alcohol or polyethylene glycols) to form a batch that will stick together when worked up in a mass. In the case of water, the moisture content of the ceramic batch commonly ranges from 5% to 7%. Organic binders are usually employed in an amount of from 2% to 3%. The batch may be molded at pressures from 5,000 to 10,000 p.s.i.g.

Dry-pressing, however, is not without drawbacks. Certain limits are imposed on the process by characteristics of the dies which in most instances result in inordinately high mold friction in addition to non-uniformity of pressure throughout the mold. This process is limited to the formation of relatively small parts because of the high pressure required for satisfactory compaction. While ceramic materials molded by this method may include details such as through-holes and slots, the configurations ordinarily do not deviate from flat pieces having a low height to width ratio.

Although hydrostatic pressing methods are also utilized in producing ceramic articles having varied shapes and sizes, this process is generally reserved for operations in which high speed and economy are not factors. Also, in a number of situations, wall thicknesses are difficult to control by this pressing method.

Accordingly, it is an object of this invention to provide new methods and compositions for the molding of objects from non-plastic, ceramic materials which do not contain clay.

A further object of the invention is to provide methods and compositions which provide for the economical and rapid molding of articles having both relatively flat and intricate configurations.

Another object of the present invention is to provide ceramic molding compositions and methods for molding which permit excellent release of the unfired article from the mold.

An additional object of the invention is to provide clay-free, non-plastic ceramic molding compositions which have superior flow properties and which produce articles which can be "flash fired."

Other highly desirable objects and advantages which are achieved in accordance with the present teachings will be apparent from the following detailed description of the invention considered with reference to the accompanying drawing.

In the drawings:

FIGURE 1 is a side cross-sectional view of an apparatus suitable for molding articles in accordance with the invention, and FIGURE 2 is a perspective view of an article molded according to the invention.

The composition of the present invention comprises a major portion of a clay-free ceramic and a minor portion of hydrated guar gum and water. It has been found that when guar gum is mixed with ceramic powder, hydrated and aged, the resulting batch has a highly viscous consistency and is not sticky. The hydrated guar gum is readily burned out during firing and, with the addition of the proper preservatives, the batch has long shelf-life.

The invention further comprises a method for making molded articles from non-plastic, clay-free ceramic materials. According to this method, ceramic powder is mixed with water and guar gum and then with water and the mixture is aged to hydrate the guar gum. The aged batch is then molded to the desired configuration, preferably in a heated mold coated with oleic acid. Although the ceramic batch containing guar gum is relatively non-sticky when compared with similar ceramic batches containing other organic additives, it has been found that the application of oleic acid to the mold surfaces greatly increases the ease with which the pressed pieces are released from the mold and plunger.

As stated, the compositions of the present invention comprise a major portion of clay-free ceramic material. Illustrative of typical ceramics suitable for use in the present invention are spodumene, petalite, berylia, chromina, cordierite, silica, sillimanite, zircon, zirconia and the like. Especially useful articles may be molded by this invention using alumina powder and mixtures of alumina with other ceramic materials.

The above ceramics may be used alone or in admixture and are preferably employed in the form of a dry powder having a particle size of about 200 mesh (Tyler) or smaller.

Guar gum and water comprise a minor portion of the composition. Guar gum is a natural gum and is the ground endosperms of $Cyanopsis\ tetragonoloba$. The material is preferably utilized in the form of a dry powder or flour which is mixed with the dry ceramic powder until a homogeneous blend is formed.

Water is then added to the blend and is mixed to form a homogeneous paste or slurry. The mixture is then aged to hydrate the guar gum.

Preservatives, such as formaldehyde, and wetting agents, such as sodium dioctyl sulfosuccinate, sodium dihexyl sulfosuccinate, sodium diamyl sulfosuccinate, sodium alkylnaphthalene sulfonate and the like, may be added to the composition, if desired. These additives are most conveniently introduced by dissolving them in the water which is added to the dry blend of ceramic and guar gum powders.

As noted previously, the ceramic constituent generally comprises a major portion and the guar gum and water a minor portion of the composition. In a typical formulation, the ceramic may comprise 60% by weight and the guar gum and water plus any preservative or wetting agent that may be used, may comprise up to 40% by weight of the composition. In a preferred composition, the weight ratio of guar gum to water is in the range of from 1:10 to 1:15.

In general, the present method comprises mixing ceramic powder of suitable mesh size with dry guar gum. Water, which may or may not contain dissolved wetting agents or preservatives, is then mixed with the dry blend of guar gum and ceramic powder to form a homogeneous batch.

The resulting mixture is then aged for a minimum of about 12 hours, under conditions which prevent the evaporation of water.

Next, portions of the batch are pressed in suitable hot molds, the smooth surfaces of which have preferably been coated with oleic acid. The oleic acid may be applied as an aqueous emulsion of oleic acid in water, the emulsion being formed with the aid of a suitable wetting agent, to increase the wetting of the mold surfaces by the oleic acid.

Pressing or molding is preferably conducted in a mold heated to a temperature not to exceed about 120° C. with the optimum mold temperature being in the range of from about 50° to 100° C. It is preferable that the pressing be done as quickly and rapidly as possible after the batch is placed in the mold before the heat of the mold causes the batch to stiffen and set up. The amount of pressure is not critical. For example, the article illustrated in the drawing may be formed by forceful hand pressure on the ram. However, higher pressures may be required where the cross-sectional area of the body in the direction perpendicular to the direction of pressure is greater.

After pressing, the article is allowed to dry until it can be extracted from the mold without distortion. The object is then completely dried and is fired to yield the finished product. If desired, the surface of the dried piece may be smoothed of irregularities, such as parting lines, by sponging with a wet sponge before firing.

Standard drying technique comprises placing the part in an oven at about 120° C. until dry. The drying time may vary depending on the particular ceramic batch, the character of the product desired and the thickness of the article. For example, for a wall thickness of about ¼″, a drying time of one hour is ample.

Firing is usually conducted by placing the article in a furnace and heating up to a suitable temperature for sintering, and for a suitable time at such temperature, that is known and/or commonly used for the particular ceramic involved. Specific temperature and time ranges vary considerably from one ceramic to another.

It has also been found that articles made from batches containing guar gum can be "flash fired" with no apparent damage to the ware. "Flash firing" refers to putting the dried green article directly into a hot furnace at a relatively high temperature, e.g., 800° C., and then heating up to sintering temperature, rather than placing it in a cold furnace and gradually heating up to sintering temperature. For example, pieces having sections with a thickness of 3/16″ have been introduced into a kiln at temperature as high as 800° C. and then have been sintered without adverse effects.

In carrying out the invention, a molding device of the type shown in FIGURE 1 may conveniently be utilized. Referring to FIGURE 1 in detail, it will be seen that the molding apparatus 10 comprises a ram 11 and a mold base or die 12.

Ram 11 has an upper flange 13 which is provided with peripheral screw threads 14 for attachment to a ram support shaft 15.

Mold base or die 12 is provided with a flange or collar 16. Between ram 11 and die 12 is situated a ring 17 which acts as a centering device for ram 11, shapes the top edge of the pressed article and retains it in the die upon withdrawal of the ram. An annular groove 18 in collar 16 provides a rounded lip 23 on the product 22.

In the preferred embodiment, the surfaces of both ram 11 and die 12 are provided with a coating 20 of oleic acid to assist release of the pressed article.

A measured batch 21 of the ceramic composition, indicated by the dotted line, is placed in die 12 and ram 11 is then lowered into the die by means of a hand operated lever (not shown) linked to support shaft 15. The batch 21 is thereby pressed against the walls of die 12 forming a thin walled article 22.

After molding at a temperature not exceeding 120° C. for at least a momentary period, e.g., 5–30 seconds, the ram is withdrawn. Ring 17 restrains article 22, preventing its removal from the die, and the coating 20 of oleic acid assists the separation of the article from ram 11. In some cases, a notable pressing period of 30 seconds or more may be desirable to "heal" those portions of the ceramic batch that may develop into "folds" or "overlaps" during the initial pressing action. "Healing" involves the substantial elimination of "folds" by fusing together the adjacent surfaces defining the "fold."

The article is then allowed to dry in the mold until it can be removed without distortion. The time required for this drying is usually from one to several minutes depending minutes depending upon the wall thickness of the article. It is next removed from the mold and subjected to further drying. However, if substantial wall thicknesses are involved, the further drying step may be carried out, at least in part, while the article remains in the mold thereby reducing the overall drying time to a minimum. The article then is fired, as previously described, to yield a strong ceramic article 24 as illustrated in FIGURE 2.

The invention will perhaps be better understood in the light of the following illustrative examples.

Example 1

About 1000 gms. of dry ceramic powder of minus 325 mesh were mixed with 40 gms. of dry guar gum. The ceramic powder comprised 72% by weight of petalite and 28% by weight of beta spodumene. The guar gum was a commercially available material furnished under the trade name Burtonite V-7-E.

When the ceramic powder and guar gum were thoroughly blended, 500 cc. of water were added and the composition was mixed thoroughly until a homogeneous paste was obtained.

The batch was aged for twelve hours and was then pressed in a mold coated with a thin film of oleic acid at a temperature of about 80° C.

Pressing was terminated and the article was allowed to dry in the mold for approximately two minutes after which time it was self supporting. It was then removed and dried further at 120° C. for about one hour. Then the article was placed in a furnace which was heated to 800° C. and the temperature was raised to 1300° C. and held there for one hour to sinter the article thoroughly.

Example 2

Following the general procedure of Example 1, a batch of the following composition is molded to form a ceramic article:

| | | |
|---|---|---|
| Ceramic powder of Example 1 | grams | 1200 |
| Guar gum | do | 60 |
| Water | cc | 740 |

The article is molded at a temperature of 50° C. and then initially dried while remaining in the mold by heating at 120° C. for about ten minutes to cause the article to be self supporting.

Example 3

Following the general procedure of Example 1, a batch of the following composition is molded to form a ceramic article:

| | | |
|---|---|---|
| Ceramic powder of Example 1 | grams | 1000 |
| Guar gum | do | 40 |
| Water | cc | 500 |
| Formaldehyde | cc | 2 |
| 10% aqueous solution of sodium dioctyl sulfosuccinate | cc | 10 |

The article is molded at a temperature of about 100° C.

Example 4

Following the general procedure of Example 1, a batch of the following composition is molded to form a ceramic article:

| | | |
|---|---|---|
| Ceramic powder of Example 1 | grams | 3000 |
| Guar gum | do | 120 |
| Water | cc | 1500 |
| Formaldehyde | cc | 6 |
| 10% aqueous solution of sodium dioctyl sulfosuccinate | cc | 30 |

The batch is aged for 24 hours, then molded at a temperature of about 100° C.

Example 5

Following the general procedure of Example 1, a batch of the following composition is molded to form a ceramic article:

| | | |
|---|---|---|
| Alumina powder | grams | 1200 |
| Guar gum | do | 60 |
| Water | cc | 640 |

Example 6

Following the general procedure of Example 1, a batch of the following composition is molded to form a ceramic article:

| | | |
|---|---|---|
| Berylia powder | grams | 1200 |
| Guar gum | do | 60 |
| Water | cc | 740 |

Example 7

Following the general procedure of Example 1, a batch of the following composition is molded to form a ceramic article:

| | | |
|---|---|---|
| Silica powder | grams | 3000 |
| Guar gum | do | 120 |
| Water | cc | 1500 |
| Formaldehyde | cc | 6 |
| 10% aqueous solution of sodium dioctyl sulfosuccinate | cc | 30 |

It will be apparent from the foregoing examples that the molding compositions contain amounts of ceramic particles ranging from about 60% to about 65%.

It will be seen, therefore, that the present invention provides a highly efficient method for molding articles from ceramic compositions which are non-plastic and do not contain clay.

The present invention has been described with reference to preferred embodiments and certain specific examples. However, it will be obvious to those skilled in the art that various changes and modifications may be made in the described compositions and procedures without departing from the spirit of the invention as expressed in the following claims.

What is claimed is:

1. A method for producing molded ceramic articles consisting essentially of the steps of: mixing a clay-free ceramic powder with guar gum and water to produce a substantially homogeneous paste, aging said paste for at least 12 hours, and pressing said paste in a mold heated to a temperature not to exceed about 120° C. into an article of the desired form, said paste consisting essentially of from about 60% to about 65% of clay-free ceramic particles and the weight ratio of guar gum to water being in the range of from about 1:10 to about 1:15.

2. A method for producing molded ceramic articles consisting essentially of the steps of: mixing a clay-free ceramic powder with guar gum and water to produce a substantially homogeneous paste, aging said paste for at least 12 hours, pressing said paste in a mold heated to a temperature not to exceed about 120° C. into an article of the desired form, drying said article, and sintering said article, said paste consisting essentially of from about 60% to about 65% of clay-free ceramic particles and the weight ratio of guar gum to water being in the range of from about 1:10 to about 1:15.

3. A method for producing molded ceramic articles consisting essentially of the steps of: mixing a clay-free ceramic powder with guar gum and water to produce a substantially homogeneous paste, aging said paste for at least 12 hours, pressing said paste in a mold heated to a temperature not to exceed about 120° C. into an article of the desired form, drying said article, flash firing said article, and sintering said article, said paste consisting essentially of from about 60% to about 65% of clay-free ceramic particles and the weight ratio of guar gum to water being in the range of from about 1:10 to about 1:15.

4. A method for producing molded ceramic articles consisting essentially of the steps of: mixing dry, clay-free ceramic powder with dry guar gum powder to form a substantially, homogeneous blend, mixing with said blend a minor portion of water to form a substantially homogeneous paste, said guar gum and said water together comprising a minor portion and said ceramic powder a major portion of said paste, aging said paste for at least about 12 hours, and pressing said paste in a mold heated to a temperature not to exceed about 120° C. into an article of the desired form, said paste consisting essentially of from about 60% to about 65% of clay-free ceramic particles and the weight ratio of guar gum to water being in the range of from about 1:10 to about 1:15.

5. The method of claim 4 wherein said paste is pressed in a mold heated to a temperature in the range of from about 50° to 100° C.

6. A method for producing molded ceramic articles consisting essentially of the steps of: mixing dry, clay-free ceramic powder with dry guar gum powder to form a substantially homogeneous blend mixing with said blend a minor portion of water to form a substantially homogeneous paste, said guar gum and said water together comprising a minor portion and said ceramic powder a major portion of said paste, aging said paste for at least about 12 hours, pressing said paste in a mold heated to a temperature not to exceed about 120° C. into an article of the desired form, drying said article, and sintering said article, said paste consisting essentially of from about 60% to about 65% of clay-free ceramic particles and the weight ratio of guar gum to water being in the range of from about 1:10 to about 1:15.

7. A method for producing molded ceramic articles consisting essentially of the steps of: mixing dry, clay-free ceramic powder with dry guar gum powder to form a substantially homogeneous blend, mixing with said blend a minor portion of water to form a substantially homogeneous paste, said guar gum and said water together comprising a minor portion and said ceramic powder a major portion of said paste, aging said paste for at least about 12 hours, placing said paste in a mold the surfaces of which are coated with a film of oleic acid, and pressing said paste in a mold heated to a temperature in the range of from 50° to 100° C. to conform to the surfaces of said mold and to form an article of the desired configuration, said paste consisting essentially of from about 60% to about 65% of clay-free ceramic particles and the weight ratio of guar gum to water being in the range of from about 1:10 to about 1:15.

8. A method for producing molded ceramic articles consisting essentially of the steps of: mixing dry, clay-free ceramic powder with dry guar gum powder to form a substantially homogeneous blend, mixing with said blend a minor portion of water to form a substantially homogeneous paste, said guar gum and said water together comprising a minor portion and said ceramic powder a major portion of said paste, aging said paste for at least about 12 hours, placing said paste in a mold the surfaces of which are coated with a film of oleic acid, pressing said paste in a mold heated to a temperature in the range of from 50° to 100° C. to conform to the surfaces of said mold and to form an article of the desired configuration, drying said article, and sintering said article, said paste consisting essentially of from about 60% to about 65% of clay-free ceramic particles and the weight ratio of guar gum to water being in the range of from about 1:10 to about 1:15.

References Cited
UNITED STATES PATENTS

| | | | |
|---|---|---|---|
| 3,096,159 | 7/1963 | Van Cott | 106—65 |
| 3,275,460 | 9/1966 | Jeanneret | 106—38.5 |

JAMES E. POER, *Primary Examiner.*

TOBIAS E. LEVOW, *Examiner.*